(12) United States Patent
Maingonnat et al.

(10) Patent No.: US 6,843,361 B2
(45) Date of Patent: Jan. 18, 2005

(54) METHOD AND DEVICE TO REGULATING SPACING AND SPEED OF OBJECTS TRAVELLING RANDOMLY

(75) Inventors: René Maingonnat, St. Paulet de Caisson (FR); André Le Biannic, Gargas (FR); Gérard Negrier, Pierresert (FR); Daniel Brulard, Jilleneuve les Avignon (FR); Eric Imbert, Marseilles (FR)

(73) Assignee: Compagnie Generalde des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 10/381,629

(22) PCT Filed: Oct. 1, 2001

(86) PCT No.: PCT/FR01/03025

§ 371 (c)(1),
(2), (4) Date: Mar. 27, 2003

(87) PCT Pub. No.: WO02/28752

PCT Pub. Date: Apr. 11, 2002

(65) Prior Publication Data

US 2004/0026212 A1 Feb. 12, 2004

(30) Foreign Application Priority Data

Oct. 2, 2000 (FR) .............................................. 00 12504

(51) Int. Cl.⁷ .............................................. B65G 47/26
(52) U.S. Cl. ...................... 198/456; 198/437; 198/444; 198/572; 198/597; 198/464.2
(58) Field of Search ................................. 198/437, 441, 198/444, 456, 457.04, 460.1, 598, 572, 597, 427, 430, 595.5, 464.2, 419.3

(56) References Cited

U.S. PATENT DOCUMENTS

| | | | |
|---|---|---|---|
| 3,899,069 A | | 8/1975 | Heinzer |
| 4,006,813 A | * | 2/1977 | Fluck ....................... 198/464.2 |
| 4,768,642 A | * | 9/1988 | Hunter .................... 198/419.2 |
| 4,946,025 A | * | 8/1990 | Murphy ................... 198/459.1 |
| 5,035,315 A | * | 7/1991 | Fukusaki et al. ......... 198/419.2 |
| 5,092,450 A | * | 3/1992 | Schommartz et al. .... 198/460.1 |
| 5,097,939 A | * | 3/1992 | Shanklin et al. ......... 198/419.2 |
| 5,797,478 A | * | 8/1998 | Gambetti .................... 198/441 |
| 5,829,574 A | * | 11/1998 | DelSanto ................. 198/460.2 |
| 6,619,196 B2 | * | 9/2003 | Dorner ........................ 101/35 |

* cited by examiner

*Primary Examiner*—Richard Ridley
(74) *Attorney, Agent, or Firm*—Pearne & Gordon LLP

(57) ABSTRACT

Method and device to regulate the spacing and speed of objects being conveyed randomly.

Objects such as nuclear fuel pellets (P) are stopped by a stop (12) placed in the extension of a conveyor (10). When the presence of at least one pellet is detected against the stop (12), a cyclic rotary device (26) thrusts said pellet laterally onto a sliding rail (24), between two separating components (22) supported by an endless belt (20). The belt (20) then moves forward by an interval equal to the spacing between two consecutive separating components (22). This ensures a feed of the pellets according to a controlled spacing and speed.

14 Claims, 4 Drawing Sheets

METHOD AND DEVICE TO REGULATING SPACING AND SPEED OF OBJECTS TRAVELLING RANDOMLY

FIELD OF THE INVENTION

The invention relates to a method devised to regulate the spacing and speed of objects initially being conveyed continuously, in succession and in a random fashion, along a given path.

The invention also relates to a device using said method.

The method and device according to the invention can particularly be used in all cases where it is desired to be able to perform inspection, processing or sorting operations on unitary parts or on assemblies of parts which are fed continuously, in a random flow. Indeed, the traffic regulation provided by means of the invention can be used to identify parts or assemblies of parts, for example by marking, counting, weighing, etc.

A preferential application of the invention relates to the regulation of the traffic of nuclear fuel pellets during production, in order to perform dynamic dimensional sorting of said pellets, by means of laser reading.

STATE OF THE RELATED ART

During the production of nuclear fuel pellets used in fuel assemblies intended for nuclear reactors, the pellets are ground to a precise size. This grinding operation is followed by dimensional sorting, which is performed dynamically, by means of laser reading.

So that the laser reading and sorting are carried out under optimal conditions, the pellet feed speed and their spacing must be constant. This requires converting the initial continuous, but random, conveyance into a regular conveyance, both in terms of spacing and speed.

At the present time, this function is carried out by a vibratory rail. However, this device known in the prior art involves a certain number of drawbacks which it is desirable to eliminate.

In this way, the setting of a vibratory rail is very delicate and subject to deviations over time.

In addition, such a device does not eliminate friction, which fluctuates with the different types of pellets produced.

SUBJECT OF THE INVENTION

The invention specifically relates to a method devised to regulate the spacing in time and space of objects such as nuclear fuel pellets, initially being conveyed continuously, but randomly, without requiring complex setting subject to deviations, and doing away with any friction phenomena.

According to the invention, this result is obtained by means of a method to regulate the spacing and speed of objects initially being conveyed continuously, in succession and in a random fashion along a first path, said method being characterised in that it comprises the following steps:

the arrival of at least the first of the objects against a stop placed in the extension of the first path is detected;

a movement of said first object laterally with respect to the first path is triggered cyclically, after detecting the arrival of said first object against the stop, so as to convey it between two consecutive separating components belonging to driving means of the objects along a second path;

the driving means are actuated to move the first object along the second path over a distance equal to the distance between the consecutive separating components; and the above steps are repeated for each of the objects.

The combined use of a stop, preferentially stationary, driving means equipped with regularly spaced separating components, and means to convey between two separating components an object resting against the stop, makes it possible to regulate the spacing between the objects and their feeding speed, without any setting. Therefore, there is no setting deviation problem over time. In addition, this arrangement makes it possible to do away with friction fluctuation phenomena according to the type of pellets produced.

In a preferred embodiment of the invention, the first object is moved laterally by rotating a cyclic rotary device such as a cam or a barrel around an axis roughly parallel with the first path.

In addition, advantageously, the first object is moved laterally so as to convey it onto a V-shaped cross-section sliding rail, oriented along the second path.

Preferentially, the second path is roughly parallel with the first path.

Advantageously, driving means which comprise an endless belt equipped with regularly spaced fingers or pins, forming the separating components, are used.

According to an interesting aspect of the invention, the driving means are actuated once the first object has been conveyed between two consecutive separating components. For this purpose, a single motor combined with indexing means to control both movements is used.

The invention also relates to a device for the implementation of the above method.

More specifically, the invention also relates to a device to regulate the spacing and speed of objects initially being conveyed continuously, in succession and in a random fashion, on conveyance means defining a first given path, said device being characterised in that it comprises a stop placed in the extension of the first path, detection means to detect the arrival of at least the first of the objects resting against said stop, driving means equipped with separating components regularly spaced with respect to each other and capable of driving said objects along a second path, movement means capable of moving said first object in a cyclic fashion, laterally with respect to the first path, in response to a signal emitted by the detection means, to convey it between two consecutive separating components, and means to control forward movement of the driving means over a distance equal to the distance between two separating components, after each use of the movement means.

BRIEF DESCRIPTION OF FIGURES

A preferred embodiment of the invention will now be described, as a non-limitative example, with reference to the appended figures, wherein.

DETAILED DESCRIPTION OF A PREFERRED EMBODIMENT OF THE INVENTION

Figure 1:
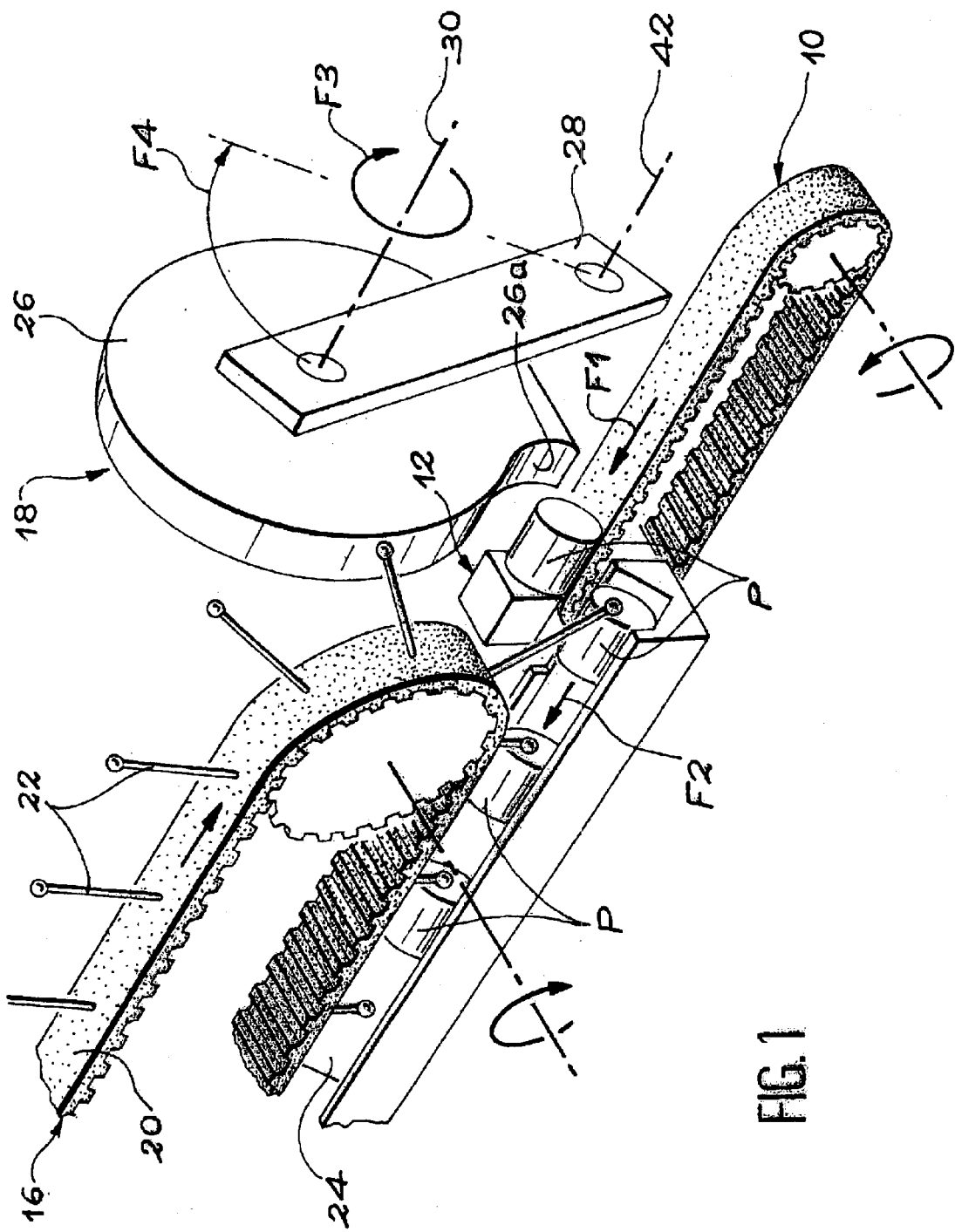
FIG. 1 is a perspective view which schematically represents a spacing regulation device according to the invention.

FIG. 1 schematically illustrates a spacing and speed regulation device according to the invention. More specifically, the device represented is applied to the spacing and speed regulation of nuclear fuel pellets P. In this case, this regulation is intended to enable downstream continuous dimensional sorting of the pellets, by means of laser reading, under optimal conditions. As already mentioned, the device according to the invention may be used to regulate the spacing and speed of parts or assemblies of parts of any other kind, without leaving the scope of the invention.

The pellets P for which the spacing and speed are to be regulated arrive in succession, in a continuous, but random, path on the upper horizontal surface of conveyance means 10.

Figure 2:
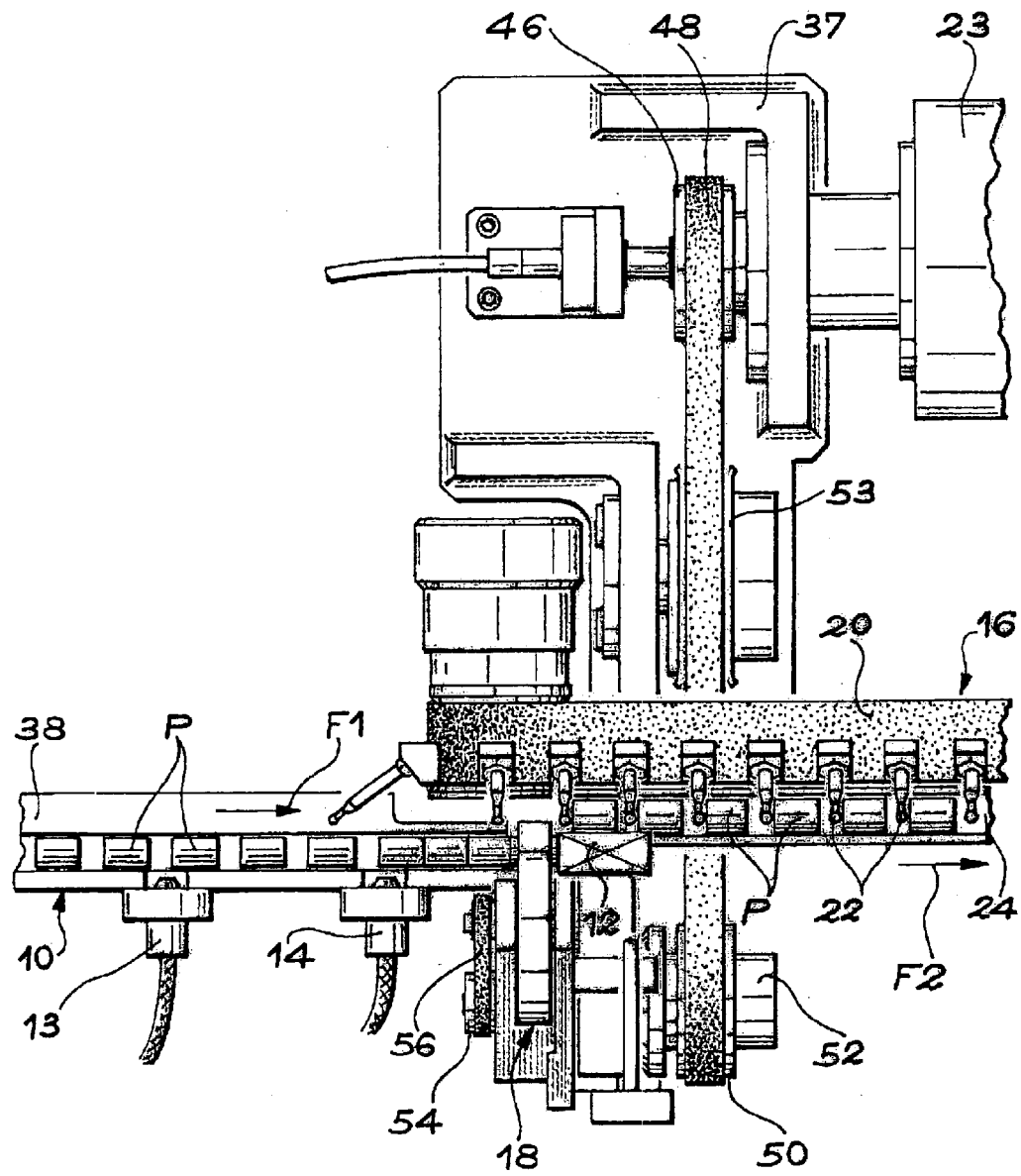
FIG. 2 is a top view of the device in FIG. 1.
Figure 3:
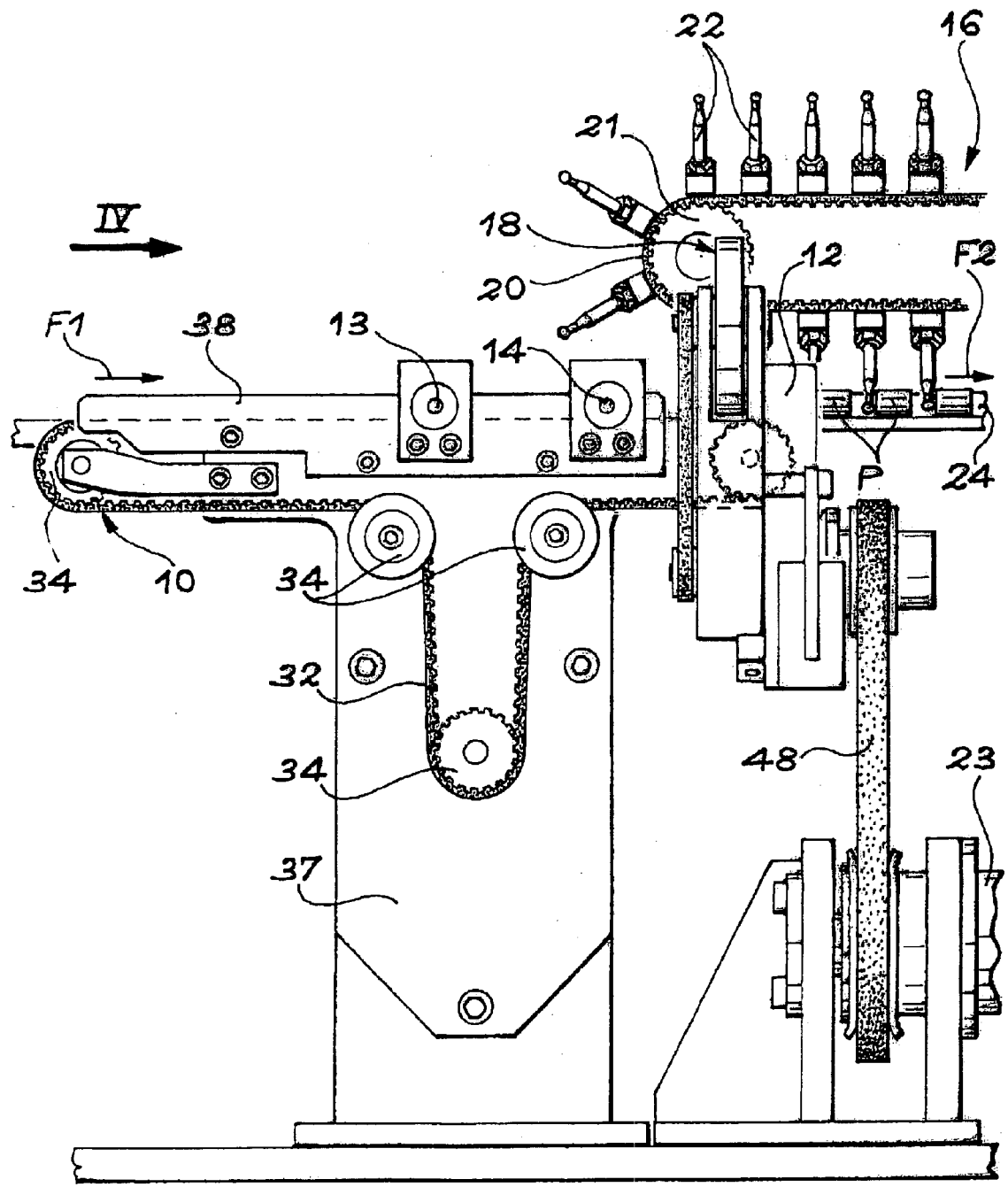
FIG. 3 is a side view of the device in FIG. 1.
Figure 4:
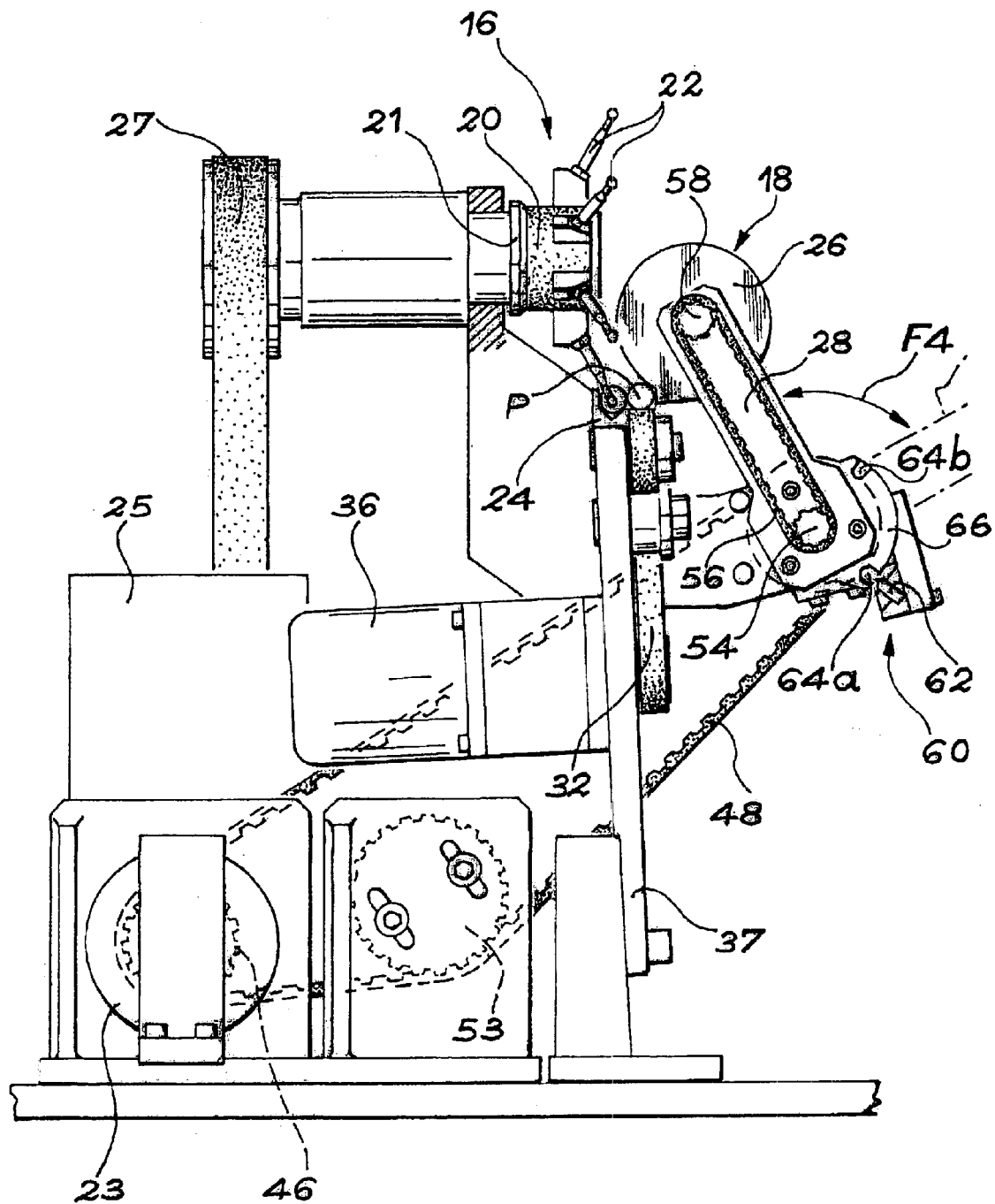
FIG. 4 is an end view along the arrow IV in FIG. 3.

More specifically, as illustrated in particular in FIGS. 2 to 4, the conveyance means 10 comprises an endless synchronous belt 32, fitted on synchronous pulleys 34. One of these synchronous pulleys is fitted on the output shaft of a geared motor 36 (FIG. 4). The synchronous pulleys 34 and the geared motor 36 are supported by a frame 37. The conveyor 10 also comprises lateral guides 38, placed at either end of the upper horizontal side of the belt 32 and wherein the spacing is slightly greater than the diameter of the pellets P.

The pellets P, cylindrical in shape, rest on the upper side of the belt 32, between the guides 38, such that their longitudinal axis is oriented in the direction of movement of the conveyance means 10. This direction, illustrated by the arrow F1 in FIGS. 1 to 3, determines the initial movement path of the pellets P.

The spacing and speed regulation device according to the invention comprises a mechanical stop 12 placed in the extension of the initial movement path of the pellets P, above the corresponding end of the conveyance means 10. The mechanical stop 12 is stationary, supported by the frame 37 and placed in the extension of the upper side of the belt 32.

One of the lateral guides 38 comprises two presence sensors 13 and 14 (FIGS. 2 and 3), offset with respect to each other in the direction of movement of the upper side of the belt 32. Said presence sensors 13 and 14 form detection means. Each one may particularly consist of a photoelectric cell, a micro switch or other device.

The detection means 13 furthest from the mechanical stop 12 are devised to detect a blockage of the pellets P against the stop 12, i.e. when the number of pellets resting against the stop exceeds a predetermined value. This value depends on the distance which separates the detection means 13 from the stop 12. In the embodiment represented as an example in the figures, this value is equal to eight.

The detection means 14 closest to the mechanical stop 12 are devised to detect the presence against the stop of a minimal number of pellets. This minimal number is at least equal to one. In the embodiment illustrated as an example in the figures, this minimal number is equal to three. As a general rule, the presence of this minimal number of pellets resting against the stop 12 determines the implementation of the device according to the invention, as shall be seen subsequently.

When a pellet P is present in front of the detection means 13 and/or 14, said means emit an electrical signal which is transmitted to a central control unit (not shown). The permanence of the signal emitted by the detection means 13 shows the existence of a blockage. The permanence of the signal emitted by the detection means 14 enables the use of the other components of the device.

The spacing and speed regulation device according to the invention also comprises driving means 16, devised to drive the pellets P one by one, with a constant spacing, along a second given path, along with movement means 18 used to move each of the pellets in succession from the first path to the second path.

More specifically, the driving means 16 comprise an endless synchronous belt 20, equipped with separating components 22 such as fingers or pins on its outer face. The belt 20 is fitted on synchronous pulleys 21 wherein only one is shown in the figures.

As illustrated in particularly in FIG. 4, one of the synchronous pulleys 21 is rotated by the output shaft of a geared motor 23 via a conical pinion indexing mechanism 25 and a synchronous belt 27, engaged on two synchronous pulleys attached respectively to the output shaft of the indexer and on the shaft supporting the synchronous pulley 21 driving the belt 20. The geared motor 23, the indexer 25 and the synchronous pulleys 21 are supported by the frame 37.

A V-shaped cross-section sliding rail 24 is placed under a lower horizontal side of the endless belt 20 and extends along a roughly horizontal direction which corresponds to said second path. More specifically, the upper face, with a V-shaped cross-section, of the sliding rail 24 is located at a level such that the pellets P resting on said face are located roughly at the same level as those located on the conveyance means 10.

In the embodiment shown, the second path is roughly parallel with the first path defined by the conveyance means 10 and offset laterally with respect to said means, while being roughly located on the same horizontal plane.

More specifically, an entry end part of the sliding rail 24 is placed next to an exit end part of the conveyance means 10, adjacent to the stop 12. The lengths of said entry and exit end parts are at least equal to the length of one pellet P liable to circulate in the device. Beyond its entry end part, the sliding rail 24 extends parallel with the conveyance means 10, at a distance from said means.

The endless belt 20 is placed above the sliding rail 24, with its lower horizontal side oriented parallel with said sliding rail, at a distance slightly greater than the diameter of the pellets.

More specifically, to account for the space requirements of the movement means 18, the belt 20 is slightly offset laterally opposite the conveyor 10, with respect to the sliding rail 24. In addition, the separating components 22 are oriented at an angle in the direction of the sliding rail 24, such that their ends are placed just above said sliding rail when said components are pointing downwards. In this way, each of the separating components 22 supported by the lower side of the belt 20 rests against the rear face of a pellet P, when the endless belt 20 moves in the direction corresponding to the pellet feed. This direction of movement is illustrated by arrows F2 in FIGS. 1 to 3.

The distance between two separating components 22 is roughly greater than the length of one pellet P, while being less than the length of two pellets. As a result, only one pellet P can be received between two consecutive separating components.

In the embodiment shown in the figures, the movement means 18 comprise a cyclic rotary device 26, such as a cam or a barrel, wherein the axis 30 is oriented parallel with the first and second paths illustrated by arrows F1 and F2 in the figures.

The cyclic rotary device 26 is fitted at one end of an arm 28 wherein the opposite end is supported by the frame 37 so as to be able to pivot around a horizontal axis 42, parallel with the axis 30.

The device 26 is presented in the form of a disk of small diameter and thickness less than the length of one pellet P. The peripheral edge of said disk comprises a single tooth 27 which comprises a working flank with a small radius of curvature, comparable to that of the pellets P, and a non-working flank roughly tangent to the peripheral edge of the disk.

As illustrated in the figures, in the operating position normally occupied by the arm 28, the device 26 is positioned above the upper side of the conveyor 10, opposite the exit end part of said conveyor. More specifically, it is offset laterally opposite the belt 20 with respect to the conveyor 10.

When the disk 26 is rotated around its axis 30, in the direction corresponding to the arrow F3 in FIG. 1, the working flank of the tooth 27 rests against a pellet P immobilised on the conveyor 10 by the stop 12, so as to move said pellet laterally on the sliding rail 24. The pellet moved in this way is then located between two consecutive separating components 22 of the driving means 16.

As illustrated more specifically in FIGS. 2 to 4, the cyclic rotary device 26 is rotated by the geared motor 23, by means of a belt mechanism. More specifically, the output shaft of the geared motor 23 drives a synchronous pulley 46 engaged on an endless synchronous belt 48. The synchronous belt 48 is also engaged on a synchronous pulley 50, attached to a shaft 52 centred on the pivoting axis 42 of the arm 28. Usually, a tension setting synchronous pulley 53 can also be engaged on the synchronous belt 48.

A second synchronous pulley 54 is also attached to the shaft 52. An endless synchronous belt 56 is engaged both on the synchronous pulley 54 and on a synchronous pulley 58. The synchronous pulley 58 is in turn centred on the rotation axis 30 of the cyclic rotary device 26 and attached to a shaft by means of which said device is fitted onto the arm 28.

The arrangement described above makes it possible to control, in a cyclic fashion, a rotation of one revolution of the device 26 around its axis 30, during use of the geared motor 23. Given that the geared motor 23 also drives the belt 20, as described above, each rotation of one revolution of the device 26 in the direction of the arrow F3 is accompanied by a forward movement of one step of the belt 20 in the direction of the arrow F2. This forward movement of one step of the belt 20 is conveyed in practical terms by a movement of said belt over a distance equal to the distance between two consecutive separating components 22. The presence of the indexer 25 in the mechanical linkage between the geared motor 23 and the belt 20 triggers the movement of the belt 20 immediately after a pellet P is thrust between two consecutive separating components 22 of said belt.

As an illustrative and in no way limitative example of the invention, in the case of 13 mm long pellets P conveyed by conveyance means 10 at 40 mm/s, a regular pellet feed on the sliding rail 24 at a rate of 1.5 pellets/s by controlling a 360° rotation of the output shaft of the geared motor 23 in 0.666 s. During a first part of said rotation, of a duration equal to, for example, 0.055 s, the pellet initially resting against the stop 12 is thrust laterally onto the sliding rail 24 by the device 26. From the end of said first period and for a period of a duration equal to, for example, 0.444 s, the strip 20 moves forward, for example, by 20 mm.

An indexing mechanism, referred to generally under the reference 60 in FIG. 4, makes it possible to maintain the arm 28 normally in the operating position illustrated in the figures. This indexing mechanism comprises a retractable finger 62, fitted on the frame 37, and two holes 64a and 64b, formed on a flange 66 centred on the axis 42 and attached to the arm 28.

When the finger 62 is placed in the hole 64a, the arm 28 occupies its operating position wherein a rotation of the device 26 results in a pellet P being thrust from the conveyor 10 onto the sliding rail 24. When the finger 62 has come out of the hole 64a, the arm can pivot around the axis 42, so as to bring the hole 64b opposite the finger. An elastic device (not shown), such as a return spring, then thrusts the finger 62 into said hole 64b so as to keep the arm 28 in this so-called "servicing" position, wherein the device 26 is no longer positioned over the conveyor 10. The switching of the arm 28 between the operating and servicing positions is illustrated schematically by arrows F4 in FIGS. 1 and 4. This switching, and the actuation of the indexing means 60, can be controlled manually, as shown, or using remote control means, without leaving the scope of the invention.

The servicing position of the arm 28 can particularly be used when an incident such as a blockage of the pellets P against the stop 12 occurs.

When the installation is active, the arm 28 occupies its operating position. The pellets P are then conveyed in succession by the conveyance means 10, in a random flow, particularly with respect to their spacing. The presence of a predetermined number of pellets P resting against the stop 12 is immediately detected by the detection means 14. Said detection means then emit a detection signal which is transmitted instantaneously to the CPU (not shown). When this signal is received, the CPU controls a rotation of a complete revolution of the cyclic rotary device 26. This rotation of the device 26 results in the pellet P which was resting against the stop 12 being thrust laterally onto the sliding rail 24. More specifically, said pellet P is then inserted between two consecutive separating components 22 of the driving means 16. The pellets P are thus inserted, one by one, between the successive separating components 22 supported by the synchronous belt 20, which moves step by step, after each arrival of a pellet onto the sliding rail 24, under the effect of the geared motor 23.

As already noted, the arm 28 can be switched to the servicing position, for example in the case of accidental blocking of the device.

The device described above guarantees a feed of the pellets P at constant intervals, on the sliding rail 24. Therefore, it is possible, downstream, to perform any pellet inspection, processing or sorting operation, for example by means of laser reading. Due to the fact that the pellet feed at constant intervals in time and space does not require any settings, the drawbacks of the prior art related to the use of a vibratory rail are eliminated.

Naturally, the invention is not limited to the embodiment described above as an example. In this way, the rotary device 26 may particularly be replaced by a thruster type sliding device performing and a to-and-fro movement along a direction roughly perpendicular to the path followed by the objects on the first conveyor. In addition, the path followed by the conveyor 20 is not necessarily parallel with that of the first conveyor. In addition, as indicated above, the conveyed objects may be of different types, without leaving the scope of the invention.

What is claimed is:

1. Method to regulate the spacing and speed of objects initially being conveyed continuously, in succession and in a random fashion along a first path, comprising the following steps:

the arrival of at least the first of the objects against a stop placed in the extension of the first path is detected;

a movement of said first object laterally with respect to the first path is triggered cyclically, after detecting the arrival of said first object against the stop, so as to convey it between two consecutive separating components belonging to driving means of the objects along a second path;

the driving means are actuated to move the first object along the second path over a distance equal to the distance between the consecutive separating components; and the above steps are repeated for each of the objects, wherein the first object is moved laterally so as to convey it onto a sliding rail, oriented along the second path, the sliding rail configured to constrain the first object from lateral movement relative to the second path.

2. Method according to claim 1 wherein the first object is moved laterally by rotating a cyclic rotary device around an axis roughly parallel with the first path.

3. Method according to claim 1, wherein the sliding rail has a V-shaped cross-section.

4. Method according to claim 1, wherein the second path is roughly parallel with the first path.

5. Method according to claim 1, wherein driving means which comprise an endless belt equipped with regularly spaced fingers, forming said separating components, are used.

6. Method according to claim 1, wherein the driving means are actuated once the first object has been conveyed between two consecutive separating components.

7. Method according to claim 1, wherein a stationary stop is used.

8. Device to regulate the spacing and speed of objects initially being conveyed continuously, in succession and in a random fashion, on a first conveyance means defining a first given path, said device comprising a stop placed in the extension of the first path, detection means to detect the arrival of at least the first of the objects resting against said stop, driving means equipped with separating components regularly spaced with respect to each other and capable of driving said objects along a second path, movement means capable of moving said first object in a cyclic fashion, laterally with respect to the first path, in response to a signal emitted by the detection means, to convey it between two consecutive separating components, and means to control forward movement of the driving means over a distance equal to the distance between two separating components, after each use of the movement means, said device also comprising a sliding rail, oriented along the second path so as to receive the first object when it is moved laterally by said movement means, the sliding rail configured to constrain the first object from lateral movement relative to the second path.

9. Device according to claim 8, wherein the movement means comprise a cyclic rotary device, capable of rotating around an axis roughly parallel with the first path.

10. Device according to claim 8, wherein the sliding rail has a V-shaped cross-section.

11. Device according to claim 8, wherein the second path is roughly parallel with the first path.

12. Device according to claim 8, wherein the driving means comprise an endless belt equipped with regularly spaced fingers forming said separating components.

13. Device according to claim 8, wherein the movement means and the driving means comprise single motorization means, the means to control forward movement of the driving means comprising indexing means.

14. Device according to claim 8, wherein the stop is stationary.

* * * * *